(12) United States Patent
Pan et al.

(10) Patent No.: US 6,932,470 B2
(45) Date of Patent: Aug. 23, 2005

(54) PHASE CHANGE INK IMAGING COMPONENT WITH Q-RESIN LAYER

(75) Inventors: David H. Pan, Rochester, NY (US); Santokh S. Badesha, Pittsford, NY (US); Anthony Yeznach, Clackamas, OR (US); Trevor J. Snyder, Newberg, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/177,910

(22) Filed: Jun. 20, 2002

(65) Prior Publication Data

US 2003/0234850 A1 Dec. 25, 2003

(51) Int. Cl.⁷ .................................................. B41J 2/01
(52) U.S. Cl. ...................................... 347/103; 347/101
(58) Field of Search ............................... 347/105, 103, 347/99, 101; 428/195, 32.1

(56) References Cited

U.S. PATENT DOCUMENTS

| | | | | | |
|---|---|---|---|---|---|
| 4,889,560 A | * | 12/1989 | Jaeger et al. | ............ | 106/31.29 |
| 5,361,126 A | * | 11/1994 | Loonen et al. | ............... | 399/308 |
| 5,366,772 A | * | 11/1994 | Badesha et al. | ............ | 428/35.8 |
| 5,369,205 A | * | 11/1994 | Eckberg et al. | ................ | 528/25 |
| 5,370,931 A | * | 12/1994 | Fratangelo et al. | .......... | 428/334 |
| 5,372,852 A | * | 12/1994 | Titterington et al. | ........ | 427/288 |
| 5,389,958 A | * | 2/1995 | Bui et al. | .................... | 347/103 |
| 5,502,476 A | * | 3/1996 | Neal et al. | ................... | 347/103 |
| 5,614,933 A | * | 3/1997 | Hindman et al. | ............ | 347/103 |
| 5,777,650 A | * | 7/1998 | Blank | .......................... | 347/103 |
| 5,790,160 A | * | 8/1998 | Reeves et al. | ............... | 347/103 |
| 5,821,956 A | * | 10/1998 | Kroon et al. | .................. | 347/43 |
| 5,933,695 A | * | 8/1999 | Henry et al. | ................. | 399/333 |
| 5,965,243 A | * | 10/1999 | Butler et al. | ................. | 428/195 |
| 6,174,937 B1 | * | 1/2001 | Banning et al. | ............. | 523/160 |
| 6,196,675 B1 | * | 3/2001 | Deily et al. | ................. | 347/103 |
| 6,297,302 B1 | * | 10/2001 | Heeks et al. | ................. | 524/262 |
| 6,342,324 B1 | * | 1/2002 | Li et al. | ........................ | 430/67 |

* cited by examiner

Primary Examiner—Manish Shah
Assistant Examiner—Leonard Liang
(74) Attorney, Agent, or Firm—Annette L. Bade

(57) ABSTRACT

An offset printing apparatus having a coated imaging member for use with phase-change inks, has a substrate, an optional intermediate layer, and thereover an outer coating with a silicone material and Q-resin, and an optional heating member associated with the offset printing apparatus.

19 Claims, 2 Drawing Sheets

PHASE CHANGE INK IMAGING COMPONENT WITH Q-RESIN LAYER

CROSS REFERENCE TO RELATED APPLICATIONS

Reference is made to the following commonly assigned, copending patent applications, including U.S. patent application Ser. No. 10/177,911 (D/A1022), filed Jun. 20, 2002, entitled, "Phase Change Ink Imaging Component Having Elastomer Outer Layer;" U.S. patent application Ser. No. 10/177,909 (D/A1022Q), filed Jun. 20, 2002, entitled, "Phase Change ink Imaging Component with Outer Layer Having Haloelastomer with Pendant Chains;" U.S. patent application Ser. No. 10/177,780 (D/A1022Q1), filed Jun. 20, 2002 entitled, "Phase Change Ink Imaging Component with Thermoplastic Layer." U.S. patent application Ser. No. 10/177,907 (D/A1022Q2), filed Jun. 20, 2002, entitled, "Phase Change ink Imaging Component with Thermoset Layer;" U.S. patent application Ser. No. 10/177,800 (D/A1022Q3), filed Jun. 20, 2002, entitled, "Phase Change Ink Imaging Component with Fluorosilicone Layer;" U.S. patent application Ser. No. 10/177,906 (D/A1022Q4), filed Jun. 20, 2002, entitled, "Phase Change Ink Imaging Component with Latex Fluoroelastomer Layer;" U.S. patent application Ser. No. 10/177,904 (D/A1022Q5), filed Jun. 20, 2002, entitled, "Phase Change ink Imaging Component with Mica-Type Silicate Layer;" U.S. patent application Ser. No. 10/177,779 (D/A1022Q7), filed Jun. 20, 2002, entitled, "Phase Change Ink Imaging Component with Polymer Blend Layer;" and U.S. patent application Ser. No. 10/177,908 (D/A1022Q8), filed Jun. 20, 2002, entitled, "Phase Change Ink Imaging Component with Polymer Hybrid Layer." The disclosures of each of these patent applications is hereby incorporated by reference in their entirety.

BACKGROUND OF THE INVENTION

The present invention relates generally to an imaging apparatus and layers for components thereof, and for use in offset printing or ink jet printing apparatuses. The layers herein are useful for many purposes including layers for transfer components, including transfix or transfuse components, imaging components, and like components. More specifically, the present invention relates to layers comprising a Q-resin material. The layers of the present invention may be useful in components used in combination with ink or dye materials. In embodiments, the layers can be used in combination with phase change inks such as solid inks.

Ink jet printing systems using intermediate transfer, transfix or transfuse members are well known, such as that described in U.S. Pat. No. 4,538,156. Generally, the printing or imaging member is employed in combination with a printhead. A final receiving surface or print medium is brought into contact with the imaging surface after the image has been placed thereon by the nozzles of the printhead. The image is then transferred and fixed to a final receiving surface.

More specifically, the phase-change ink imaging process begins by first applying a thin liquid, such as, for example, silicone oil, to an imaging member surface. The solid or hot melt ink is placed into a heated reservoir where it is maintained in a liquid state. This highly engineered ink is formulated to meet a number of constraints, including low viscosity at jetting temperatures, specific visco-elastic properties at component-to-media transfer temperatures, and high durability at room temperatures. Once within the printhead, the liquid ink flows through manifolds to be ejected from microscopic orifices through use of proprietary piezoelectric transducer (PZT) printhead technology. The duration and amplitude of the electrical pulse applied to the PZT is very accurately controlled so that a repeatable and precise pressure pulse can be applied to the ink, resulting in the proper volume, velocity and trajectory of the droplet. Several rows of jets, for example four rows, can be used, each one with a different color. The individual droplets of ink are jetted onto the liquid layer on the imaging member. The imaging member and liquid layer are held at a specified temperature such that the ink hardens to a ductile viscoelastic state.

After depositing the image, a print medium is heated by feeding it through a preheater and into a nip formed between the imaging member and a pressure member, either or both of which can also be heated. A high durometer synthetic pressure member is placed against the imaging member in order to develop a high-pressure nip. As the imaging member rotates, the heated print medium is pulled through the nip and is pressed against the deposited ink image with the help of a pressure member, thereby transferring the ink to the print medium. The pressure member compresses the print medium and ink together, spreads the ink droplets, and fuses the ink droplets to the print medium. Heat from the preheated print medium heats the ink in the nip, making the ink sufficiently soft and tacky to adhere to the print medium. When the print medium leaves the nip, stripper fingers or other like members, peel it from the printer member and direct it into a media exit path.

To optimize image resolution, the transferred ink drops should spread out to cover a predetermined area, but not so much that image resolution is compromised or lost. The ink drops should not melt during the transfer process. To optimize printed image durability, the ink drops should be pressed into the paper with sufficient pressure to prevent their inadvertent removal by abrasion. Finally, image transfer conditions should be such that nearly all the ink drops are transferred from the imaging member to the print medium. Therefore, it is desirable that the imaging member has the ability to transfer the image to the media sufficiently.

The imaging member is multi-functional. First, the ink jet printhead prints images on the imaging member, and thus, it is an imaging member. Second, after the images are printed on the imaging member, they can then transfixed or transfused to a final print medium. Therefore, the imaging member provides a transfix or transfuse function, in addition to an imaging function.

In order to ensure proper transfer and fusing of the ink off the imaging member to the print medium, certain nip temperature, pressure and compliance are required. Unlike laser printer imaging technology in which solid fills are produced by sheets of toner, the solid ink is placed on the imaging member one pixel at a time and the individual pixels must be spread out during the transfix process to achieve a uniform solid fill. Also, the secondary color pixels on the imaging member are physically taller than the primary color pixels because the secondary pixels are produced from two primary pixels. Therefore, compliance in the nip is required to conform around the secondary pixels and to allow the primary pixel neighbors to touch the media with enough pressure to spread and transfer. The correct amount of temperature, pressure and compliance is required to produce acceptable image quality.

Currently, the imaging member useful for solid inks or phase change inks comprises anodized aluminum. This member operates at about 57° C. to about 64° C. and can be used with a heater that preheats the print media prior to entering the nip. Otherwise, the imaging member may include a heater associated therewith. The heater may be associated anywhere on the offset printing apparatus. The current aluminum-imaging member has several drawbacks. A high nip load of up to about 770 pounds is needed for transfix or transfuse operations. Further, because of the high nip load, bulky mechanisms and supporting structures are needed, resulting in increased printer weight and cost. One example is that a fairly complex two-layer pressure roller is needed. In addition, the first copy out time is unacceptable because of the bulky weight. Moreover, low cohesive failure temperature is another drawback to use of an anodized aluminum drum.

Several coatings for the imaging member have been suggested. Examples are listed below.

U.S. Pat. No. 5,092,235 discloses a pressure fixing apparatus for ink jet inks having 1) outer shell of rigid, non-compliant material such as steel, or polymer such as acetal homopolymer or Nylon 6/6 and 2) an underlayer of elastomer material having a hardness of about 30 to 60, or about 50 to 60.

U.S. Pat. No. 5,195,430 discloses a pressure fixing apparatus for ink jet inks having 1) outer shell of rigid, non-compliant material such as steel, or polymer such as acetal homopolymer or Nylon 6/6 and 2) an underlayer of elastomer material having a hardness of about 30 to 60, or about 50 to 60, which can be polyurethane (VIBRATHANE, or REN:C:O-thane).

U.S. Pat. No. 5,389,958 discloses an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), and a pressure roller with elastomer surface.

U.S. Pat. No. 5,455,604 discloses a fixing mechanism and pressure wheels, wherein the pressure wheels can be comprised of a steel or plastic material such as DELRIN. Image-receiving drum 40 can be a rigid material such as aluminum or stainless steel with a thin shell mounted to the shaft, or plastic.

U.S. Pat. No. 5,502,476 teaches a pressure roller having a metallic core with elastomer coating such as silicones, urethanes, nitrites, or EPDM, and an intermediate transfer member surface of liquid, which can be water, fluorinated oils, glycol, surfactants, mineral oil, silicone oil, functional oils such as mercapto silicone oils or fluorinated silicone oils or the like, or combinations thereof.

U.S. Pat. No. 5,614,933 discloses an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), or polyphenylene sulfide loaded with PTFE, and a pressure roller with elastomer surface.

U.S. Pat. No. 5,790,160 discloses an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), or polyphenylene sulfide loaded with PTFE, and a pressure roller with elastomer surface.

U.S. Pat. No. 5,805,191 an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), or polyphenylene sulfide loaded with PTFE, and an outer liquid layer of liquid, which can be water, fluorinated oils, glycol, surfactants, mineral oil, silicone oil, functional oils such as mercapto silicone oils or fluorinated silicone oils or the like, or combinations thereof.

U.S. Pat. No. 5,808,645 discloses a transfer roller having a metallic core with elastomer covering of silicone, urethanes, nitrites, and EPDM.

U.S. Pat. No. 6,196,675 B1 discloses separate image transfer and fusing stations, wherein the fuser roller coatings can be silicones, urethanes, nitrites and EPDM.

U.S. Pat. No. 5,777,650 discloses a pressure roller having an elastomer sleeve, and an outer coating that can be metals, (aluminum, nickel, iron phosphate), elastomers (fluoroelastomers, perfluoroelastomers, silicone rubber, polybutadiene), plastics (polyphenylene sulfide with PTFE filler), thermoplastics (polyethylene, polyamide (nylon), FEP), thermosets (acetals, ceramics). Preferred is annodized aluminum.

In addition, many different types of outer coatings for transfer members, fuser members, and intermediate transfer members have been used in the electrostatographic arts using powder toner, but not with liquid inks or phase change inks. Several examples are listed herein.

U.S. Pat. No. 5,361,126 discloses an imaging apparatus including a transfer member including a heater and pressure-applying roller, wherein the transfer member includes a fabric substrate and an impurity-absorbent material as a top layer. The impurity-absorbing material can include a rubber elastomer material.

U.S. Pat. No. 5,337,129 discloses an intermediate transfer component comprising a substrate and a ceramer or grafted ceramer coating comprised of integral, interpenetrating networks of haloelastomer, silicon oxide, and optionally polyorganosiloxane.

U.S. Pat. No. 5,340,679 discloses an intermediate transfer component comprised of a substrate and thereover a coating comprised of a volume grafted elastomer, which is a substantially uniform integral interpenetrating network of a hybrid composition of a fluoroelastomer and a polyorganosiloxane.

U.S. Pat. No. 5,480,938 describes a low surface energy material comprising a volume grafted elastomer which is a substantially uniform integral interpenetrating network of a hybrid composition of a fluoroelastomer and a polyorganosiloxane, the volume graft having been formed by dehydrofluorination of fluoroelastomer by a nucleophilic dehydrofluorinating agent, followed by a hydrosilation reaction, addition of a hydrogen functionally terminated polyorganosiloxane and a hydrosilation reaction catalyst U.S. Pat. No. 5,366,772 describes a fuser member comprising a supporting substrate, and a outer layer comprised of an integral interpenetrating hybrid polymeric network comprised of a haloelastomer, a coupling agent, a functional polyorganosiloxane and a crosslinking agent.

U.S. Pat. No. 5,456,987 discloses an intermediate transfer component comprising a substrate and a titamer or grafted titamer coating comprised of integral, interpenetrating networks of haloelastomer, titanium dioxide, and optionally polyorganosiloxane.

U.S. Pat. No. 5,848,327 discloses an electrode member positioned near the donor member used in hybrid scavengeless development, wherein the electrode members have a composite haloelastomer coating.

U.S. Pat. No. 5,576,818 discloses an intermediate toner transfer component including: (a) an electrically conductive substrate; (b) a conformable and electrically resistive layer comprised of a first polymeric material; and (c) a toner release layer comprised of a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer.

U.S. Pat. No. 6,035,780 discloses a process for forming a layer on a component of an electrostatographic apparatus, including mixing a first fluoroelastomer and a polymeric siloxane containing free radical reactive functional groups, and forming a second mixture of the resulting product with a mixture of a second fluoroelastomer and a second polysiloxane compound.

U.S. Pat. No. 5,537,194 discloses an intermediate toner transfer member comprising: (a) a substrate; and (b) an outer layer comprised of a haloelastomer having pendant hydrocarbon chains covalently bonded to the backbone of the haloelastomer.

U.S. Pat. No. 5,753,307 discloses fluoroelastomer surfaces and a method for providing a fluoroelastomer surface on a supporting substrate which includes dissolving a fluoroelastomer; adding a dehydrofluorinating agent; adding an amino silane to form a resulting homogeneous fluoroelastomer solution; and subsequently providing at least one layer of the homogeneous fluoroelastomer solution to the supporting substrate.

U.S. Pat. No. 5,840,796 describes polymer nanocomposites including a mica-type layered silicate and a fluoroelastomer, wherein the nanocomposite has a structure selected from the group consisting of an exfoliated structure and an intercalated structure.

U.S. Pat. No. 5,846,643 describes a fuser member for use in an electrostatographic printing machine, wherein the fuser member has at least one layer of an elastomer composition comprising a silicone elastomer and a mica-type layered silicate, the silicone elastomer and mica-type layered silicate form a delaminated nanocomposite with silicone elastomer inserted among the delaminated layers of the mica-type layered silicate.

U.S. Pat. No. 5,933,695 discloses a rapid wake up fuser member comprising a substrate, a heat transmissive layer provided on the substrate and having a silicone material and a Q-resin, and a toner release layer comprising a polymer and provided on the heat transmissive layer.

It is desired to provide a multi-functional imaging member for use with phase change ink printing machines, which has the ability to receive an image, and either transfer, or transfer and fuse the image to a print medium. It is desired that the imaging member when having heat associated therewith, be thermally stable for conduction for fusing or fixing. It is further desired that the imaging member have a relatively low nip load, in order to decrease the weight and cost of the prints.

SUMMARY OF THE INVENTION

The present invention provides, in embodiments: an offset printing apparatus for transferring a phase change ink onto a print medium comprising: a) a phase change ink component for applying a phase change ink in a phase change ink image; b) an imaging member for accepting the phase change ink image from the phase change ink component, and transferring the phase change ink image from the imaging member to the print medium, the imaging member comprising: i) an imaging substrate, and thereover ii) an outer coating comprising a silicone material and a Q-resin.

The present invention further provides, in embodiments: an offset printing apparatus for printing a phase change ink onto a print medium comprising: a) a phase change ink component for applying a phase change ink in a phase change ink image; b) an imaging member for accepting said phase change ink image from said phase change ink component, and transferring the phase change ink image from said imaging member to said print medium and for fixing the phase change ink image to said print medium, the imaging member comprising in order: i) an imaging substrate, ii) an intermediate layer, and iii) an outer coating comprising a silicone material and a Q-resin; and c) a heating member associated with the offset printing apparatus.

In addition, the present invention provides, in embodiments: an offset printing apparatus comprising a phase change ink component containing a phase change ink; an imaging member comprising a substrate, and thereover an outer coating comprising a silicone material and a Q-resin; and a heating member associated with the offset printing apparatus, wherein the phase change ink component dispenses the phase change ink onto the imaging member, and wherein the phase change ink is solid at room temperature.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to an offset printing apparatus useful with phase-change inks such as solid inks, and comprising a coated imaging member capable of accepting, transferring and in some embodiments, fixing an ink image to a print medium. The imaging member can be a roller such as a drum, or a film component such as a film, sheet, belt or the like. In embodiments, the imaging member comprises a substrate and an outer layer comprising a Q-resin. In an alternative embodiment, the imaging member comprises a substrate, an optional intermediate layer, and outer layer comprising a Q-resin. The substrate, intermediate layer, and/or outer layer can further comprise fillers dispersed or contained therein.

The details of embodiments of phase-change ink printing processes are described in the patents referred to above, such as U.S. Pat. Nos. 5,502,476; 5,389,958; and 6,196,675 B1, the disclosures of each of which are hereby incorporated by reference in their entirety.

Figure 1:
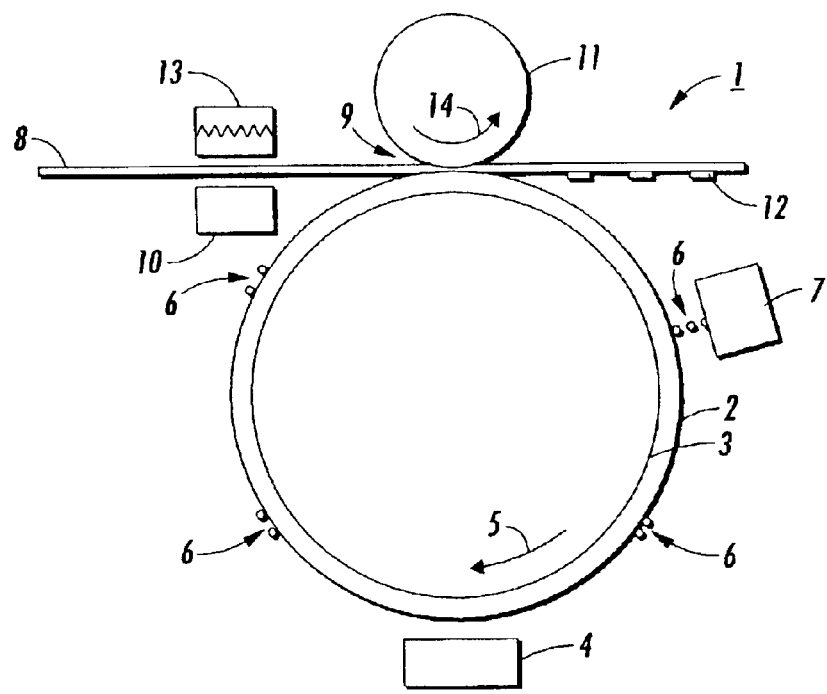
FIG. 1 is an illustration of an embodiment of the invention, and includes a transfer printing apparatus using an imaging member in the form of a drum.

Referring to FIG. 1, offset printing apparatus 1 is demonstrated to show transfer of an ink image from the imaging member to a final printing medium or receiving substrate. As the imaging member 3 turns in the direction of arrow 5, a liquid surface 2 is deposited on imaging member 3. The imaging member 3 is depicted in this embodiment as a drum member. However, it should be understood that other embodiments can be used, such as a belt member, film member, sheet member, or the like. The liquid layer 2 is deposited by an applicator 4 that may be positioned at any place, as long as the applicator 4 has the ability to make contact and apply liquid surface 2 to imaging member 3.

The ink used in the printing process can be a phase change ink, such as, for example, a solid ink. The term "phase change ink" means that the ink can change phases, such as a solid ink becoming liquid ink or changing from solid into a more malleable state. Specifically, in embodiments, the ink can be in solid form initially, and then can be changed to a molten state by the application of heat energy. The solid ink may be solid at room temperature, or at about 25° C. The solid ink may possess the ability to melt at relatively high temperatures above from about 85° C. to about 150° C. The ink is melted at a high temperature and then the melted ink 6 is ejected from printhead 7 onto the liquid layer 2 of imaging member 3. The ink is then cooled to an intermediate temperature of from about 20° C. to about 80° C., or about 72° C., and solidifies into a malleable state in which it can then be transferred onto a final receiving substrate 8 or print medium 8.

The ink has a viscosity of from about 5 to about 30 centipoise, or from about 8 to about 20 centipoise, or from about 10 to about 15 centipoise at about 140° C. The surface tension of suitable inks is from about 23 to about 50 dynes/cm. Examples of a suitable inks for use herein include those described in U.S. Pat. Nos. 4,889,560; 5,919,839; 6,174,937; and 6,309,453, the disclosure each of which are hereby incorporated by reference in their entirety.

Some of the liquid layer 2 is transferred to the print medium 8 along with the ink. A typical thickness of transferred liquid is about 100 angstroms to about 100 nanometer, or from about 0.1 to about 200 milligrams, or from about 0.5 to about 50 milligrams, or from about 1 to about 10 milligrams per print medium.

Suitable liquids that may be used as the print liquid surface 2 include water, fluorinated oils, glycol, surfactants, mineral oil, silicone oil, functional oils, and the like, and mixtures thereof. Functional liquids include silicone oils or polydimethylsiloxane oils having mercapto, fluoro, hydride, hydroxy, and the like functionality.

Feed guide(s) 10 and 13 help to feed the print medium 8, such as paper, transparency or the like, into the nip 9 formed between the pressure member 11 (shown as a roller), and imaging member 3. Arrow 14 shows the direction of pressure member 11. It should be understood that the pressure member can be in the form of a belt, film, sheet, or other form. In embodiments, the print medium 8 is heated prior to entering the nip 9 by heated feed guide 13. When the print medium 8 is passed between the printing medium 3 and the pressure member 11, the melted ink 6 now in a malleable state is transferred from the imaging member 3 onto the print medium 8 in image configuration. The final ink image 12 is spread, flattened, adhered, and fused or fixed to the final print medium 8 as the print medium moves between nip 9. Alternatively, there may be an additional or alternative heater or heaters (not shown) positioned in association with offset printing apparatus 1. In another embodiment, there may be a separate optional fusing station located upstream or downstream of the feed guides.

The pressure exerted at the nip 9 is from about 10 to about 1,000 psi., or about 500 psi, or from about 200 to about 500 psi. This is approximately twice the ink yield strength of about 250 psi at 50° C. In embodiments, higher temperatures, such as from about 72 to about 75° C. can be used, and at the higher temperatures, the ink is softer. Once the ink is transferred to the final print medium 8, it is cooled to an ambient temperature of from about 20° C. to about 250° C.

Stripper fingers (not shown) may be used to assist in removing the print medium 8 having the ink image 12 formed thereon to a final receiving tray (also not shown).

Figure 2:
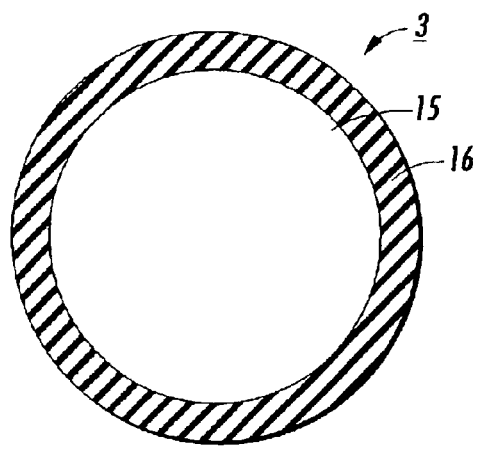
FIG. 2 is an enlarged view of an embodiment of a printing drum having a substrate and an outer Q-resin layer thereon.

FIG. 2 demonstrates an embodiment of the invention, wherein imaging member 3 comprises substrate 15, having thereover outer coating 16.

Figure 3:
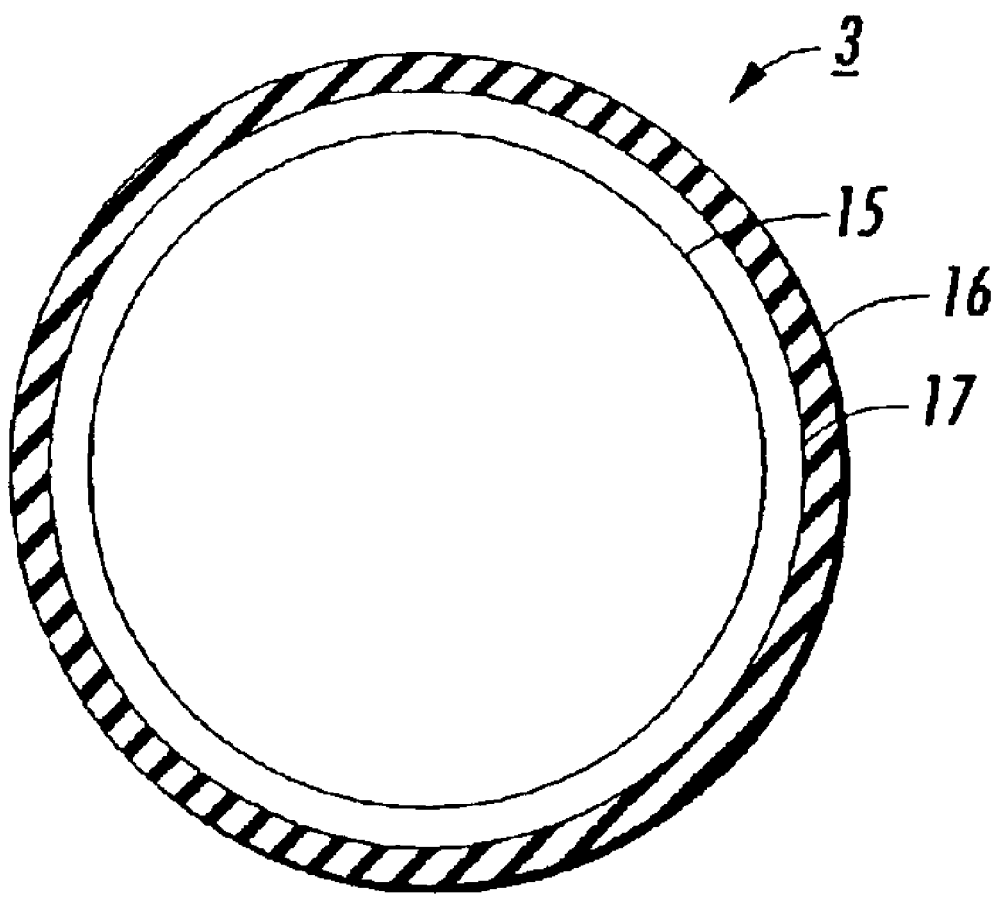
FIG. 3 is an enlarged view of an embodiment of a printing drum having a substrate, an optional intermediate layer, and an outer Q-resin layer thereon.

FIG. 3 depicts another embodiment of the invention. FIG. 3 depicts a three-layer configuration comprising a substrate 15, intermediate layer 17 positioned on the substrate 15, and outer layer 16 positioned on the intermediate layer 17. In embodiments, the outer release layer 16 comprises a Q-resin. In another embodiment, a Q-resin is added to a silicone material to act as a reinforcing agent that may crosslink with the silicone material making it more stable and increasing the strength thereof. The combination of Q-resin and silicone material is then used as the outer layer 16. In embodiments, an outer liquid layer 2 (as described above) may be present on the outer layer 16.

Examples of suitable silicone materials include room temperature vulcanization (RTV) silicone rubbers and low temperature vulcanization (LTV) silicone rubbers. These rubbers are known and readily available commercially such as SYLGARD® 182 from Dow Corning and RTV615 Silicone Rubber from General Electric Silicones. Other suitable silicone materials include the silanes, siloxanes (such as, polydimethylsiloxanes), fluorosilicones, methylphenylsilicones, dimethylsilicones, liquid silicone rubbers (such as vinyl crosslinked or silanol room temperature crosslinked materials), and the like.

The term "Q-resin" as used herein refers to a siloxane gel-like structure containing functionalized silicone groups dispersed within a polydimethylsiloxane fluid. The Q-resin can be obtained in the viscosity range of 4,000–70,000 cps with molecular weight ranging from about 70,000 to about 200,000. In embodiments, the functionalized groups comprise vinyl, silanol, alkoxy, methyl, ethyl, and the like groups.

The Q-resin reacts with the silicone material and thereby crosslinks with the silicone material. The Q-resin acts as a reinforcing agent and crosslinking agent. A generic example of an embodiment of a Q-resin structure is set forth as the following Formula I:

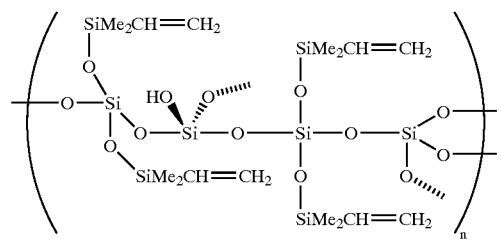

wherein n represents a number and is from about 100 to about 325, or from about 200 to about 300. Reference is made to the United Chemical Technologies, Inc. (UCT) Technical Support. A commercially available vinyl-containing Q-Resin Fluid is available from UCT. In embodiments, the functionalized groups above can be replaced with silanol, alkoxy, methyl, ethyl, and the like groups.

The Q-resin can be present in the outer layer in an amount of from about 5 to about 95 weight percent, or from about 15 to about 65 weight percent by weight of the silicone material. The silicone material can be present in the outer layer in an amount of from about 95 to about 0 weight percent, from about 95 to about 5 weight percent, or from about 85 to about 35 weight percent by weight of the Q-resin.

The hardness of the outer Q-resin layer is typically from about 10 Shore D to about 60 Shore D, or from about 60 Share A to about 50 Shore D.

In embodiments, the thickness of the outer Q-resin layer imaging layer is from about 0.5 to about 20 mils, or from about 0.5 to about 6 mils, or from about 0.5 to about 4 mils.

The substrate, optional intermediate layer, and/or outer layer, in embodiments, may comprise fillers dispersed therein. These fillers can have the ability to increase the material hardness or modulus into the desired range. In one embodiment, there are no fillers present in the outer layer.

Examples of fillers include fillers such as metals, metal oxides, doped metal oxides, carbon blacks, ceramics, polymers, and the like, and mixtures thereof. Examples of suitable metal oxide fillers include titanium dioxide, tin (II) oxide, aluminum oxide, indium-tin oxide, magnesium oxide, copper oxide, iron oxide, silica or silicon oxide, and the like, and mixtures thereof. Examples of carbon fillers include carbon black (such as N-990 thermal black, N330 and N110 carbon blacks, and the like), graphite, fluorinated carbon (such as ACCUFLUOR® or CARBOFLUOR®), and the like, and mixtures thereof. Examples of ceramics include silicates such as zirconium silicate, boron nitride, aluminum nitride, and the like, and mixtures thereof. Examples of polymer fillers include polytetrafluoroethylene powder, polypyrrole, polyacrylonitrile (for example, pyrolyzed polyacrylonitrile), polyaniline, polythiophenes, and the like, and mixtures thereof. The optional filler is present in the substrate, optional intermediate layer, and/or outer layer in an amount of from about 0 to about 30 percent, or from about 1 to about 20 percent, or from about 1 to about 5 percent by weight of total solids in the layer. Total solids by weight, as used herein, refers to the total amount by weight of Q-resin, silicone material, fillers, additives, and any other solids.

The imaging substrate can comprise any material having suitable strength for use as an imaging member substrate. Examples of suitable materials for the substrate include metals, fiberglass composites, rubbers, and fabrics. Examples of metals include steel, aluminum, nickel, and their alloys, and like metals, and alloys of like metals. The thickness of the substrate can be set appropriate to the type of imaging member employed. In embodiments wherein the substrate is a belt, film, sheet or the like, the thickness can be from about 0.5 to about 500 mils, or from about 1 to about 250 mils. In embodiments wherein the substrate is in the form of a drum, the thickness can be from about $1/32$ to about 1 inch, or from about $1/16$ to about $5/8$ inch.

Examples of suitable imaging substrates include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, a weldable seam, and the like.

In an optional embodiment, an intermediate layer may be positioned between the imaging substrate and the outer layer. Materials suitable for use in the intermediate layer include silicone materials, elastomers such as fluoroelastomers, fluorosilicones, ethylene propylene diene rubbers, and the like, and mixtures thereof. In embodiments, the intermediate layer is conformable and is of a thickness of from about 2 to about 60 mils, or from about 4 to about 25 mils.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1

An aluminum substrate imaging member having the dimensions of about 10 inches long, about 4 inches in diameter, and about 0.25 inches thick, was coated with a thin layer of an adhesive layer. This was then overcoated with Dow Corning SYLGARD® 182 (also GE Silicones GE RTV615), having 50% by weight of a Q-resin. The silicone layer was formed by conventional coating methods, including flow coating. The resulting imaging roller was heat cured at a temperature of about 300° F. for a time of about 15 minutes.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An offset printing apparatus for transferring a phase change ink onto a print medium comprising:

a) a phase change ink component for applying a phase change ink in a phase change ink image;

b) an imaging member for accepting said phase change ink image from said phase change ink component, and transferring the phase change ink image from said imaging member to said print medium, the imaging member comprising:

i) an imaging substrate, and thereover ii) an outer coating comprising a silicone material and a Q-resin, wherein said outer layer has a hardness of from about 10 Shore D to about 60 Shore D; and c) a pressure member in pressure contact with said imaging member.

2. The offset printing apparatus of claim 1, wherein said Q-resin comprises a siloxane compound having functionalized end groups.

3. The offset printing apparatus of claim 2, wherein said functionalized end groups comprise functional groups selected from the group consisting of vinyl, silanol, alkoxy, methyl and ethyl groups.

4. The offset printing apparatus of claim 3, wherein said Q-resin has the following Formula I:

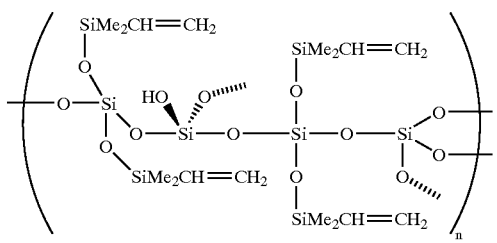

wherein n represents a number and is from about 100 to about 325.

5. The offset printing apparatus of claim 1, wherein said silicone material is selected from the group consisting of room temperature vulcanization silicone rubbers and low temperature vulcanization silicone rubbers.

6. The offset printing apparatus of claim 1, wherein said silicone material is selected from the group consisting of silanes, siloxanes, fluorosilicones, and dimethylsilicones.

7. The offset printing apparatus of claim 1, wherein said Q-resin is present in the outer layer in an amount of from about 5 to about 95 weight percent by weight of total solids.

8. The offset printing apparatus of claim 1, wherein said silicone material is present in the outer layer in an amount of from about 95 to about 5 weight percent by weight of total solids.

9. The offset printing apparatus of claim 1, wherein said outer layer has a thickness from about 0.5 to about 20 mils.

10. The offset printing apparatus of claim 1, wherein said outer layer comprises a filler.

11. The offset printing apparatus of claim 10, wherein said filler is selected from the group consisting of carbon blacks, metal oxides, metals, polymers, ceramics and mixtures thereof.

12. The offset printing apparatus of claim 1, wherein an intermediate layer is positioned between said substrate and said outer coating.

13. The offset printing apparatus of claim 12, wherein said intermediate layer comprises a material selected from the group consisting of elastomers and silicone materials.

14. The offset printing apparatus of claim 1, wherein said substrate is in the form of a roller.

15. The offset printing apparatus in accordance with claim 1, wherein said substrate comprises a material selected from the group consisting of aluminum and stainless steel.

16. The offset printing apparatus of claim 1, wherein said phase change ink is solid at about 25° C.

17. The offset printing apparatus of claim 1, wherein said phase change ink comprises a dye.

18. An offset printing apparatus for printing a phase change ink onto a print medium comprising:
 a) a phase change ink component for applying a phase change ink in a phase change ink image;
 b) an imaging member for accepting said phase change ink image from said phase change ink component, and transferring the phase change ink image from said imaging member to said print medium and for fixing the phase change ink image to said print medium, the imaging member comprising in order:
  i) an imaging substrate,
  ii) an intermediate layer, and
  iii) an outer coating comprising a silicone material and a Q-resin, wherein said outer layer has a hardness of from about 10 Shore D to about 60 Shore D;
 c) a pressure member in pressure contact with said imaging member; and
 d) a heating member associated with the offset printing apparatus.

19. An offset printing apparatus comprising:
 a) a phase change ink component containing a phase change ink;
 b) a imaging member comprising:
  i) a substrate, and thereover
  ii) an outer coating comprising a silicone material and a Q-resin, wherein said outer layer has a hardness of from about 10 Shore D to about 60 Shore D;
 c) a pressure member in pressure contact with said imaging member; and
 d) a heating member associated with said offset printing apparatus, wherein said phase change ink component dispenses said phase change ink onto said imaging member, and wherein said phase change ink is solid at about 25° C.

* * * * *